United States Patent [19]

Ovarnström

[11] 4,325,200
[45] Apr. 20, 1982

[54] METHOD AND APPARATUS FOR FILLING SEEDLING POTS

[76] Inventor: Bengt G. L. Ovarnström, Råkvägen 2, S-230 22, Smygehamn, Sweden

[21] Appl. No.: 198,942
[22] PCT Filed: Nov. 7, 1979
[86] PCT No.: PCT/SE79/00229
  § 371 Date: Jul. 8, 1980
  § 102(e) Date: Jul. 3, 1980
[87] PCT Pub. No.: WO80/00906
  PCT Pub. Date: May 15, 1980

[51] Int. Cl.³ .............................................. A01G 1/00
[52] U.S. Cl. ...................................... 47/1 A; 141/67; 141/172
[58] Field of Search .................. 47/1 A; 53/258, 527; 141/67, 172

[56] References Cited

U.S. PATENT DOCUMENTS 3,587,675  6/1971  Di Tucci .......................... 47/1 A X
3,848,360 11/1974  Million ........................... 47/1 A X

FOREIGN PATENT DOCUMENTS 304442  5/1918  Fed. Rep. of Germany .
121530  3/1971  Norway .

Primary Examiner—Robert E. Bagwill
Attorney, Agent, or Firm—Jon M. Lewis

[57] ABSTRACT

Seedling pots (2) with perforated side and bottom walls in a tray (1) are filled with growth medium by placing the tray with the pots in a matrix (11) fitting to the underside of the tray (1) with the pots and forming lid in a closed box (9) connected to suction means (21, 22). The box is dipped into a suspension (18) of growth medium which is sucked into the pots until they are filled with growth medium. The box is then raised out of the suspension and the tray removed from the box.

7 Claims, 2 Drawing Figures

FIG. I

METHOD AND APPARATUS FOR FILLING SEEDLING POTS

TECHNICAL FIELD

The present invention relates to a new and useful method and apparatus for filling growth medium into seedling pots with perforated side and bottom walls. The invention is intended particularly for growing seedlings of reforestation trees.

BACKGROUND ART

Seedling pots or containers filled with growth medium such as peat or mixtures of peat and fibers and/or earth are used to germinate seeds and grow seedlings until they are large enough to be transplanted into the soil. The containers are often perforated in order to drain surplus water and to aerate the growth medium. The use of perforated containers makes possible the so called elevated growing, in which water and nourishment are sprinkled onto the upper surface of the containers which are supported in apertures of a plate or form depressions in this, whereas the walls and bottoms of the containers are situated in an airfilled space, which by so called air pruning will diminish the egress of roots through the perforations.

The seedlings may be transplanted either together with the perforated pot, which then must permit the passage of roots through the perforations and be easily ruptured by the roots, or the seedlings together with a lump of growth medium may be removed from the pot and transplanted as such into the soil.

The usual way to fill seedling containers is to fill dry growth medium in the containers, compact the medium and water it to an appropriate moisture.

In order to get a suitable pore space the dry growth medium must have a suitable structure and composition. E.g. when growing forest plants, usually peat or mixtures of peat and fibrous material are used. In order to get a correct air capacity the peat must be compressed so that it expands on wetting. For this purpose a special quality called chips-peat is produced. It consists of compressed granules of peat and is supposed to swell to the correct volume when watered.

DISCLOSURE OF INVENTION

According to the invention a tray with perforated pots either formed as depressions in one piece with the tray or releasably hanging from apertures in the tray, is placed and locked into a perforated matrix fitting to the underside of the tray with the pots. The matrix forms the lid of a closed box, which together with the matrix and the tray are dipped into a suspension of growth medium in water. Water and air are sucked out from the box. When the pots are filled with growth medium the box is raised from the suspension. Water is sucked from the box until the appropriate water content is attained. Then the tray is removed from the box and a new tray is placed in the box. Any surplus of growth medium on the tray may be brushed away.

The porosity and the water content of the growth medium in the pots may be deliberately controlled by the concentration of the suspension and by the time and force of the sucking. It is possible in this way to compensate for different properties of the growth medium.

The invention also comprises an apparatus for filling seedling pots with growth medium according to the method described above. The apparatus is defined in the following description of the drawing.

BRIEF DESCRIPTION OF DRAWINGS AND BEST MODE FOR CARRYING OUT THE INVENTION

The figures also show the function of the apparatus as will be described below.

Figure 1:
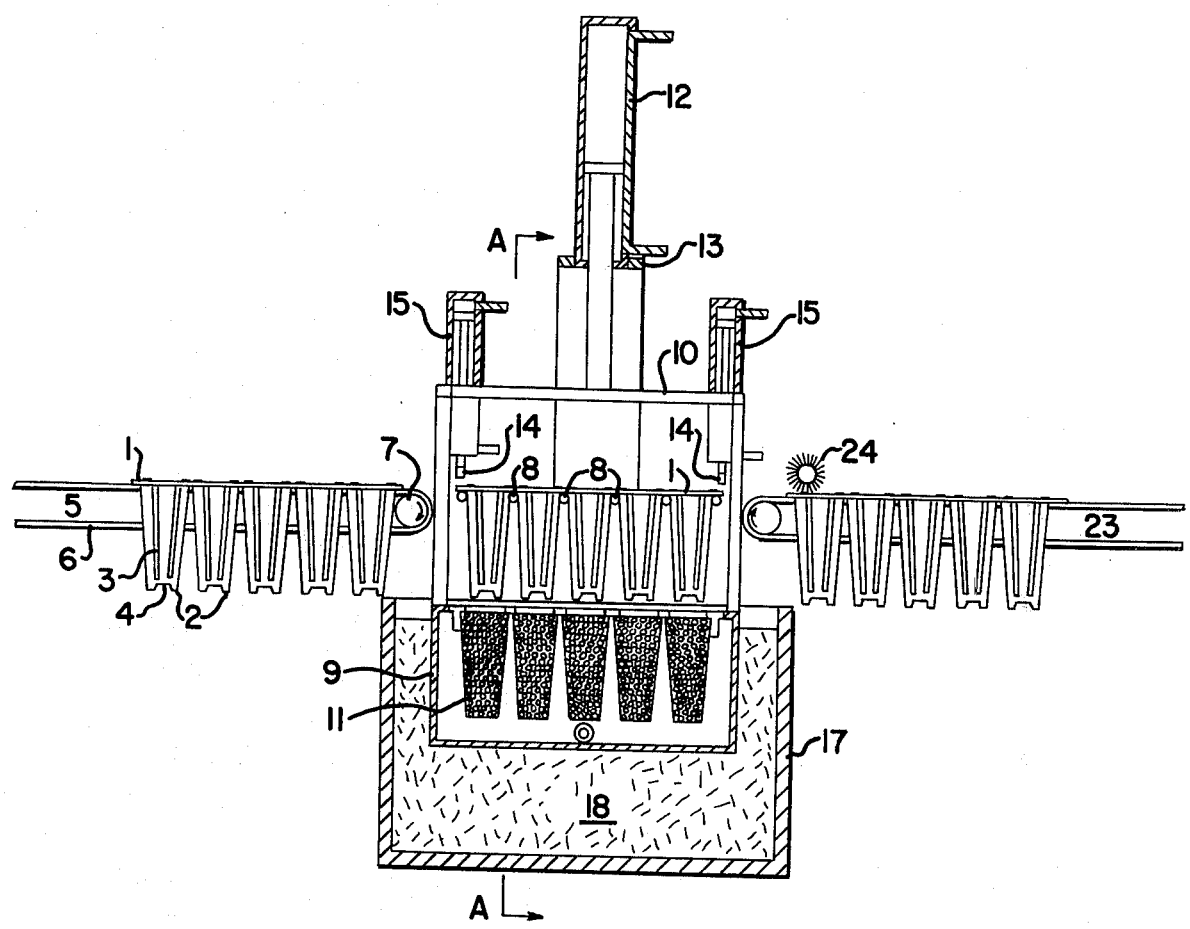
FIG. 1 is a sectional length view of an apparatus according to the invention.
Figure 2:
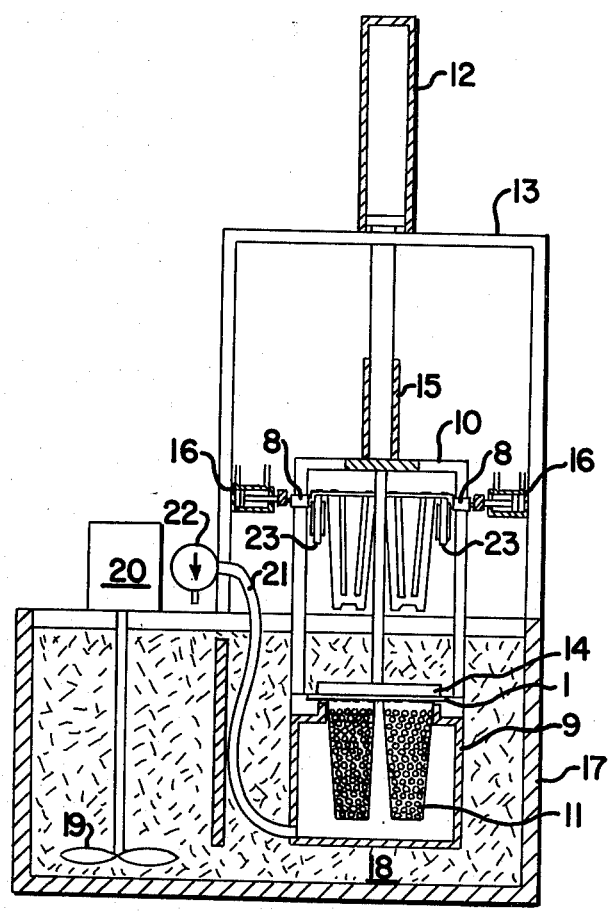
FIG. 2 is a sectional end view of the same apparatus looking in the direction of the arrows of line A—A in FIG. 1.

A tray 1 with pots 2 perforated by slits 3 in the walls and holes 4 in the bottoms is moved on a first conveyor 5 preferably comprising ropes 7 supporting the edges or brims of the tray 1 and driven by wheels 7 onto two series of rollers 8 also supporting the brims of the tray 1. A box 9 hanging in a yoke or lifting beam 10 and with a lid 11 formed as a matrix fitting the underside of the tray is raised by a hydraulic lift 12 on a bridge 13 against the underside of the tray 1 and the pots 2. The perforations of the matrix must be small enough to prevent the growth medium from passing. The matrix may be made of netting or perforated plate. In the upper rim of the box there are notches for the rollers 8. The tray is clasped by bars 14 lowered by hydraulics 15 in the yoke 10, which lock the tray to the box as shown in FIG. 2. The rollers 8 are withdrawn by hydraulics 16 and both tray and box are dipped into a vat 17 filled with a suspension 18 of growth medium e.g. peat in water. This situation is shown in FIG. 2. The suspension is held in movement by a mixing propeller 19 driven by a motor 20. Air and water are withdrawn from the box 9 through a flexible hose 21 by a pump 22. The water may be returned to the vat. When the pots 2 are filled with a suitable amount of growth medium the box 9 is raised until the tray is above the surface of the suspension 12. By selecting the concentration of the suspension and the time and underpressure in the box a suitable porosity of the growth medium can be achieved. The pumping is continued until the growth medium has the correct water content for germinating of seeds. An air-content of 40–45% by volume and a water-content of 40–45% by volume has been recommended for forest seedlings. Then the box 9 is raised until the rolls 8 can be moved in under the brim of the tray. The bars 14 are lifted from the tray. The box 9 is lowered as shown in FIG. 1. By a friction drive, not shown, the tray 1 is moved onto a second conveyor 23. Surplus of growth medium is brushed away by a rotating brush 24.

I claim:

1. A method for filling growth medium into seedling pots with perforated side and bottom walls, characterized by the following consecutive steps:
    (a) a tray with the seedling pots is placed in a perforated matrix forming the lid of a closed box,
    (b) the box with the tray and the pots is dipped into an aqueous suspension of growth medium,
    (c) air and water are sucked from the box until the pots are filled with growth medium,
    (d) the box is raised out of the suspension and
    (e) the tray with the pots is separated from the box.

2. A method as claimed in claim 1, characterized in that the porosity of the growth medium in the pots is controlled by choosing the concentration of the suspension and the sucking time.

3. A method as claimed in claim 1, characterized in that the water content of the growth medium in the pots is controlled by rising the box until the tray is above the surface of the suspension and sucking out the surplus water.

4. A method as claimed in claim 1, characterized in that surplus of growth medium on the tray is brushed away.

5. An apparatus for filling growth medium into seedling pots (2) with perforated side and bottom walls in a tray (1) comprising
 (a) a first conveyor (5) for moving the trays into the apparatus,
 (b) a perforated matrix (11) fitting to the underside of the tray (1) with the pots (2) and forming lid in closed box (9) connected to suction means (21, 22),
 (c) means (10, 12) for placing the tray (1) in the matrix (11),
 (c) a vat (17) for containing a suspension of growth medium,
 (e) means (10, 12) for dipping the box (9) with the tray (1) and the pots (2) into the vat (17) and raising the box (9) out of the suspension,
 (f) conveyor (23) for transporting the tray (1) with the filled pots (2) out from the apparatus.

6. An apparatus as claimed in claim 5 comprising locking means (14, 15) for locking the tray (1) with the pots (2) into the matrix (11) on the box (9).

7. An apparatus as claimed in claim 5 comprising a rotating brush (24) for removing surplus growth medium from the tray (1) when leaving the apparatus.

* * * * *